Jan. 6, 1959

G. RAISBECK 2,867,693

EQUALIZATION OF APERTURE EFFECT

Filed May 28, 1954

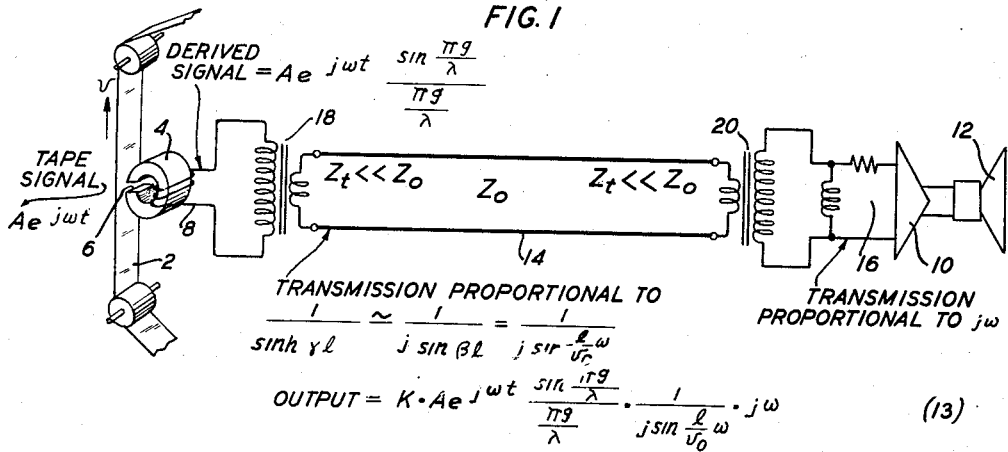

FIG. 1

$$\text{OUTPUT} = K \cdot A e^{j\omega t} \frac{\sin \frac{\pi g}{\lambda}}{\frac{\pi g}{\lambda}} \cdot \frac{1}{j \sin \frac{\ell}{v_0} \omega} \cdot j\omega \qquad (13)$$

ADJUST $\ell$ AND $v$ SO THAT $$\frac{\ell}{v_0} \omega = \frac{\pi g}{\lambda}, \qquad (14)$$

OR $\quad \frac{2\ell}{v_0} = \frac{g}{v}, \qquad (15)$

THEN $$\text{OUTPUT} = K_1 A e^{j\omega t} \qquad (16)$$

FIG. 3

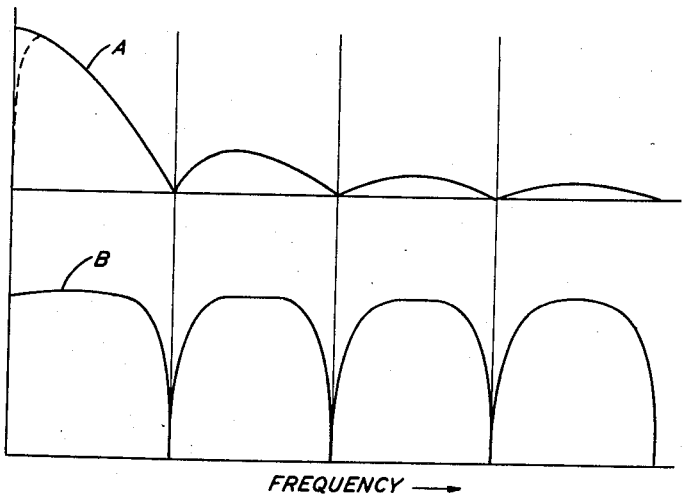

FREQUENCY →

INVENTOR
G. RAISBECK

BY Harry C. Hart

ATTORNEY

Jan. 6, 1959  G. RAISBECK  2,867,693
EQUALIZATION OF APERTURE EFFECT
Filed May 28, 1954  3 Sheets-Sheet 2

FIG. 2

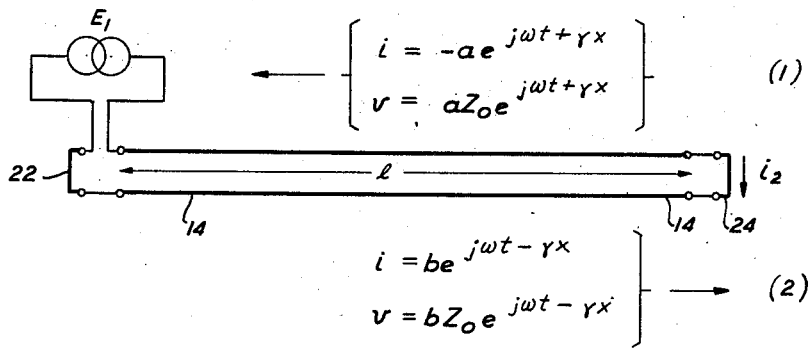

$$\left\{ \begin{array}{l} i = -ae^{j\omega t + \gamma x} \\ v = aZ_o e^{j\omega t + \gamma x} \end{array} \right\} \quad (1)$$

$$\left\{ \begin{array}{l} i = be^{j\omega t - \gamma x} \\ v = bZ_o e^{j\omega t - \gamma x} \end{array} \right\} \longrightarrow (2)$$

$$E_1 = aZ_o e^{j\omega t} + bZ_o e^{j\omega t} \tag{3}$$

$$i_2 = -ae^{j\omega t + \gamma \ell} + be^{j\omega t - \gamma \ell} \tag{4}$$

$$E_2 = 0 = aZ_o e^{j\omega t + \gamma \ell} + bZ_o e^{j\omega t - \gamma \ell} \tag{5}$$

$$\frac{a}{b} = -e^{-2\gamma \ell} \tag{6}$$

$$E_1 = aZ_o e^{j\omega t}(1 - e^{2\gamma \ell}) \tag{7}$$

$$i_2 = -ae^{j\omega}(2e^{\gamma \ell}) \tag{8}$$

$$\frac{i_2}{E_1} = \frac{1}{Z_o} \cdot \frac{-2e^{\gamma \ell}}{1 - e^{2\gamma \ell}} = \frac{1}{Z_o} \cdot \frac{1}{\sinh \gamma \ell} \tag{9}$$

$$\gamma = \alpha + j\beta \tag{10}$$

$$\beta = \frac{\omega \ell}{v_o} \tag{11}$$

$$\frac{i_2}{E_1} = \frac{1}{Z_o} \cdot \frac{1}{j \sin \frac{\omega \ell}{v_o}} \tag{12}$$

INVENTOR
G. RAISBECK
BY Harry C. Hart
ATTORNEY

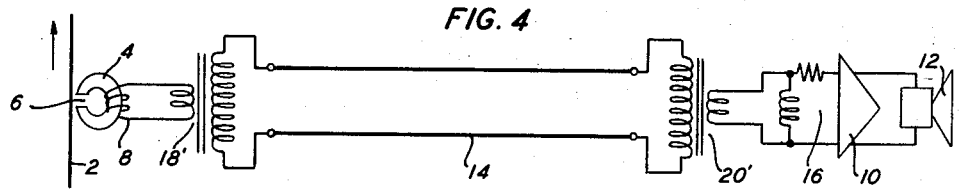
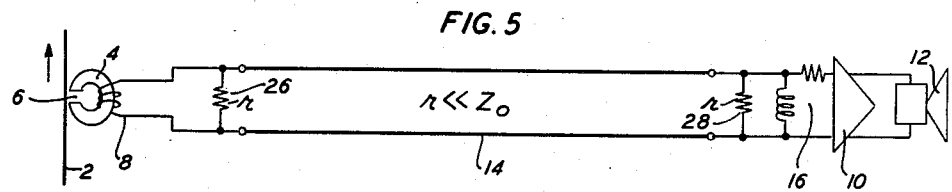
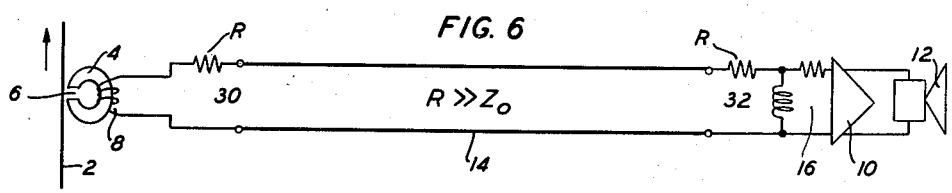
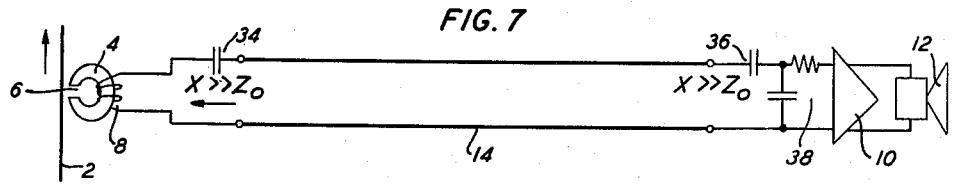
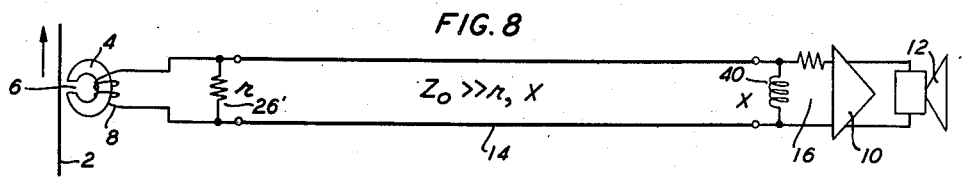
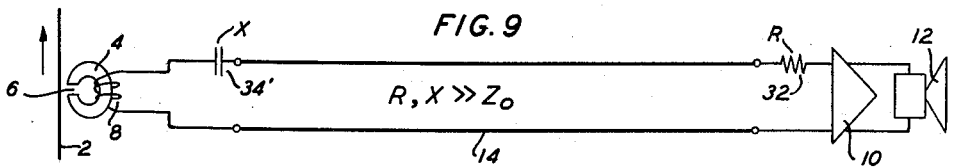

United States Patent Office 2,867,693
Patented Jan. 6, 1959

2,867,693

EQUALIZATION OF APERTURE EFFECT

Gordon Raisbeck, Bernards Township, Somerset County, N. J., assignor to Bell Telephone Laboratories, Incorporated, New York, N. Y., a corporation of New York Application May 28, 1954, Serial No. 433,236

16 Claims. (Cl. 179—100.2)

This invention relates to the equalization of a frequency-dependent transfer characteristic and particularly to the equalization of the aperture effect.

Every element which acts to convert a space pattern record into a time function by scanning the former introduces into its output, which is otherwise proportional to the intensity of the space pattern record, frequency distortion known as the "Aperture Effect." The aperture effect finds its origin in the fact that in order to furnish a useful power output, the scanning aperture must be of finite size and so embraces a finite fraction of each wavelength of the recorded signal. The aperture effect and the frequency distortion which it introduces have been extensively treated by Mertz and Gray in the Bell System Technical Journal for July 1934, volume 13, page 464. While this treatment is given in particular connection with the scanning of a two-dimensional record by a flying spot, as in the television and facsimile arts, it holds in principle equally well in many other situations. Thus, for example, a case of considerable practical importance is found in the art of deriving time signals from signals magnetically recorded on a tape by means of a reproducer head having a gap past which the tape is moved.

The aperture effect frequency distortion follows the well known $$\frac{\sin x}{x}$$

form, characterized, by an envelope which falls inversely with the frequency and by a succession of equally spaced nulls at those frequencies at which the aperture embraces 1, 2, 3, etc., full wavelengths of the record. The variable $x$ in this expression depends, of course, on the wavelength of the record and the dimensions of the aperture.

The present invention, in its principal form, is based on the realization that a continuous uniform transmission line which is similarly terminated at both ends, either with open-circuit terminations, or short-circuit terminations, is characterized by a transfer impedance or admittance having a frequency response given by $$\frac{1}{\sin x}$$

where $x$ depends on the length of the line, the speed of propagation of waves along it, and the frequency. In accordance with the invention, therefore, such a uniform line is connected in tandem between the aperture which is the source of the distortion and the reproducing device, wherefore the two mathematical expressions may be multiplied together. To retain the line characteristics unchanged when it is thus coupled, the coupling at each end should be by way of an element which introduces a high degree of impedance mismatch; i. e., a reflecting termination. The line constants are so coordinated with the aperture constants that $x$ has the same value in the expression to be equalized and in the expression for the transmission line. Under these conditions the sinusoidal variations with frequency of the line offset those of the aperture. Hence the line acts as an equalizer for the oscillatory frequency distortion introduced by the aperture; i. e., for the entire aperture effect except for the inverse frequency decay of the envelope.

In accordance with a further feature of the invention, the decay of the envelope of the characteristic is in turn compensated by the inclusion in tandem with the aperture and the equalizing line of a network which acts to multiply the signal which reaches it by a factor which is proportional to frequency. It turns out that the same co-ordination of line constants with aperture constants which makes possible the equalization of the sinusoidal variation operates at the same time to equalize the reciprocal variation. Accordingly, the characteristic of the entire combination is rendered independent of frequency.

The foregoing holds with exactness for an ideal line having no losses. Its transfer admittance function has poles of infinite magnitude at the nulls of the gap characteristic. The presence of losses in the line naturally prevents the line characteristic from reaching infinity at any point. Accordingly, as a practical matter, the nulls of the aperture characteristic remain in fact uncompensated. It turns out, however, that excellent compensation is possible, with a substantially flat characteristic from zero frequency to a frequency slightly less than that of the first null, and equally flat compensation at the same amplitude from a frequency slightly higher than that of each null to a frequency slightly less than that of the next null. In other words, the characteristic of the combination is flat except for a sequence of sharp narrow dips. In addition, therefore, to providing substantially perfect equalization between zero frequency and the frequency of the first null, the invention also provides equalization beyond the first or any other null and throughout the spectrum except for narrow regions surrounding each null.

The $$\frac{\sin x}{x}$$

function exactly defines the frequency characteristic of a rectangular aperture. Reference to the Mertz and Gray paper shows related expressions for the frequency distortion introduced by apertures of other shapes. The continuous uniform transmission line followed by the multiplying network, which is exact for the rectangular aperture, provides approximate equalization for the frequency characteristic of a non-rectangular aperture up to the frequency of the first null of the aperture characteristic, but its equalization becomes less and less perfect as frequency increases. In accordance with a further feature of the invention, more refined equalization is provided by the employment of a transmission line whose characteristic differs in detail from that of the foregoing $$\frac{\sin x}{x}$$

characteristic. In particular, in the case of most non-rectangular apertures, the nulls of their frequency characteristics are unequally spaced. A characteristic of this type can be compensated in accordance with the invention by the employment of a transmission line having an appropriate amount of dispersion.

The invention will be fully apprehended from the following detailed description of a preferred embodiment thereof taken in connection with the appended drawings, in which:

Fig. 1 is a schematic circuit diagram showing a system for reproducing signals recorded on a magnetic tape and including a loosely coupled transmission line, short-circuited at each end and a frequency-multiplying network;

Fig. 2 shows a continuous uniform transmission line, short-circuited at each end, and develops the mathematical expressions which describe its behavior;

Fig. 3 shows the frequency characteristic of a rectangular aperture, uncompensated and as compensated in accordance with the invention; and Figs. 4 through 9 are schematic circuit diagrams illustrating alternatives to the system of Fig. 1.

Referring now to the drawings, a tape 2 which may bear a magnetically recorded signal is moved at a speed $v$ by means not shown past the gap 6 in a magnetic pickup head 4. In accordance with the magnetic reproducing art in its most elementary form, this unit may comprise an iron core linked by a coil 8 of wire and provided with a saw cut which constitutes the gap. Normally the coil is connected directly or by way of an amplifier 10 to a reproducer 12. In the specific case in which the space pattern record on the tape is that of a voice message or a musical program, the reproducer 12 may be a sound reproducer.

In accordance with the present invention, two new elements are interposed between the pickup head and the reproducer, namely, a transmission line 14 which is similarly terminated at both ends by mismatching terminations $Z_t$, and a network 16 which introduces a multiplying factor proportional to frequency.

This line 14 is coupled to the pickup head 4 at its input end and to the frequency multiplying network 16 at its output end with a high degree of impedance mismatch. That is to say, the impedance $Z_t$ seen from the line looking into either of its terminations is much less, perhaps a hundred times smaller, than the characteristic impedance $Z_0$ of the line. Such mismatching terminations are indicated in the drawing by a step-down transformer 18 at the input end of the line 14 and a step-up transformer 20 at the output end.

The signal recorded on the tape 2 may be a complex wave, representable by a linear combination of complex exponential terms of the form $Ae^{j\omega t}$, where $\omega = 2\pi f$ and $f$ is the frequency of a sinusoidal component. The frequency multiplying network 16 may be of any desired variety, a simple one being merely the combination of a shunt inductance element and a series resistance element.

Fig. 2 shows a continuous uniform transmission line 14 of length $l$ terminated at either end in short-circuits 22, 24 and energized at its left-hand end by a generator of voltage $E_1$ which represents the combined effects of the tape 2, the head 4, and the transformer 18. Such a line is characterized by waves of current and voltage which travel from right to left, having the forms indicated in Equations 1 and by waves of current and voltage which travel from left to right having the forms indicated in Equations 2. In these expressions, $Z_0$ represents the characteristic impedance and $\gamma$ represents the propagation constant of the line. Evidently the total voltage at the left-hand end is as given in Equation 3, the total current at the right-hand end is as given in Equation 4 and total voltage at the right-hand end is as given in Equation 5. From Equation 5, Equation 6 follows. This may be substituted in 3 and 4 to give 7 and 8. Division of 8 by 7 gives, immediately, Equation 9, which states the ratio of the current at the right-hand end to the voltage at the left-hand end of the line. The symbols employed in the foregoing equations have the meanings which are traditional in the analysis of transmission lines.

Assuming, for the present, that the losses of the transmission line 14 may be disregarded, i. e., that in Equation 10 $\alpha = o$ then, making the substitutions 10 and 11 in 9 leads immediately to Equation 12, which states that the transfer admittance of the line is an inverse sinusoidal function of the frequency. Hence, referring again to Fig. 1, for a given voltage induced at the left-hand end of the short-circuited transmission line 14 by the passage of a magnetization condition on the tape 2 past the gap 6 a current flows in the output circuit of the line 19 which is proportional to Equation 12.

Returning now to Fig. 1, the characteristic of the $$\sin \frac{\pi g}{\lambda}$$

gap is $$\frac{\pi g}{\lambda}$$

where $g$ is the length of the gap in the direction of tape movement and $\lambda$ is the recorded wavelength. Therefore, for a signal of wavelength $\lambda$ on the tape 2, the signal applied to the input terminals of the transmission line 14 is as given by the first bracketed factor of Equation 13 while the effect of the transmission line on this signal is as given by the second bracketed factor in Equation 13. The product of these two factors is applied to the frequency multiplying network 16. Inasmuch as the signal thus applied to the network 16 is in fact a sinusoidal time function, the multiplying function may readily be carried out by a simple differentiator. The effect of this process is to multiply the foregoing factors by a third factor which is proportional to frequency, i. e., the third factor of Equation 13. Hence it is only necessary to adjust the length $l$ of the line 14 and its propagation speed $v_0$ in relation to the length of the gap $g$ and the wavelength $\lambda$ of the record as shown in Equations 14 and 15, whereupon full equalization for the frequency characteristic of the gap 6 is achieved. Upon making the substitution defined in 15, 13 reduces to 16. Evidently the output as given in Equation 16 differs from the signal recorded on the tape 2 only by the constant factor related to the propagation speed $v_0$ of waves on the line 14 and the length $g$ of the gap.

In the foregoing development, line losses were disregarded; i. e., the factor was neglected in Equation 10. When such line losses are taken into account, it turns out that the output of the line is related to the input not in accordance with the simple Expression 13 but in a more complicated fashion which is graphically depicted in curve B of Fig. 3. Referring now to Fig. 3, the unequalized aperture characteristic is shown in curve A as having the well known $$\frac{\sin x}{x} \text{ form}$$

Curve B shows the characteristic of the combination of such an aperture with the equalizer of the invention. Evidently it is flat from zero frequency nearly to the frequency of the first null where it drops suddenly to zero, rising again to the same amplitude at a slightly higher frequency and remaining substantially flat nearly to the frequency of the second null, and so on. The effects of line losses are twofold: they reduce the ideal characteristic to zero at the nulls of the unequalized characteristic and they reduce the flatness of the equalized characteristic between nulls to a successively greater extent at higher frequencies.

By an analysis similar to the foregoing analysis, it can be shown that the transfer impedance of a transmission line which is effectively open-circuited has the same form as Equation 12. Hence, the invention may be practiced as well with an open-circuited transmission line as with a short-circuited transmission line. Stated in other terms, if the invention may be practiced with the circuit of Fig. 1, it may equally be practiced with the dual counterpart of the circuit of Fig. 1. Such a dual counterpart is shown in Fig. 4. Here the tape 2, the core 4, the gap 6, the multiplying network 16, the amplifier 10 and the reproducer 12 are as before and are designated with like reference characters. Now, however, the transmission line 14 is fed at its input end by way of a step-up transformer 18' and feeds the reproducer 12 from its output end by way of a step-down transformer 20'. The turns ratios of these transformers are to be selected in such a fashion that the impedance of the source and of the receiver, respectively, as seen through the coupling transformers 18', 20' from the line, are many times larger than the characteristic impedance of the line itself.

Because of their employment of input transformers and output transformers, the systems of Figs. 1 and 4 fail to transmit energy at zero frequency and transmit at reduced amplitude levels at very low frequencies. Hence, the actual frequency characteristic is as indicated by the broken line in curve A of Fig. 3. By employment of transformers of the best available design, the low frequency cutoff of the system may be extended sufficiently close to zero for most practical purposes.

This minor shortcoming of the apparatus of Figs. 1 and 4 may be cured by dispensing with the transformers as indicated in Fig. 5 wherein the tape 2, the pickup head 4, the frequency multiplying network 16, the reproducer 12 and the transmission line 14 are the same as in Figs. 1 and 4. The couplings at each end of the line 14, however, are now by way of shunt resistors 26, 28 whose magnitudes $r$ are very much less, for example a hundred times smaller, than the characteristic impedance $Z_0$ of the line. Such a coupling constitutes a virtual short circuit at each end of the line and furnishes an impedance mismatch between the line and each of its terminations in the required high degree.

Fig. 6 shows a terminated system which bears the same relation to Fig. 5 as Fig. 4 bears to Fig. 1; i. e., it is terminated effectively in an open circuit at each end. Here again the tape 2, the pickup head 4, the line 14, the multiplying network 16 and the reproducer 12 are as before. Now, however, the line 14 is coupled to the pickup head 4 on the one hand and to the multiplying network 16 on the other by series resistors 30, 32 whose magnitudes $R$ are are much larger, for example a hundred times larger, than that of the characteristic impedance of the line. The effect is the same.

Fig. 7 bears a relation to Fig. 1 which in large measure is the same as that of the relation of Fig. 6 to Fig. 5. The line 14 is terminated in high impedances and these high impedances are furnished by series condensers 34, 36 located at each end of the line 14 whose reactances $X$, are in each case much higher, for example one hundred times higher, than the characteristic of the impedance of the line at any frequency of interest. This arrangement is open to the same minor objection as those of Figs. 1 and 4, namely, it fails because of the interposition of the condensers 34, 36 to transmit energy of zero frequency.

A further distinction of the system of Fig. 7 from the systems of Figs. 1, 4, 5 and 6 is found in the fact that either of these two condensers 34, 36 alone operates to introduce into the output a factor which increases in proportion to frequency. Both of them together therefore introduce a factor which increases as the square of the frequency. To compensate for this, a frequency dividing network 38 is connected in tandem between the transmission line 14 and the reproducer 12 in place of the multiplying networks 16 of Figs. 1, 4, 5 and 6.

While it is recommended that the terminating impedances of the line 14 be either very high or very low compared with the characteristic impedance of the line, it is not necessary that they be both either resistive or reactive. Fig. 8 shows a system which is otherwise the same as Fig. 1, corresponding elements bearing like reference characters, in which the line 14 is terminated at its input end with a small shunt resistor 26', as in the case of Fig. 5, and at its output end with a choke coil 40. The latter element serves both as a low impedance termination of reactive character for the output end of the transmission line 14 and as one element of the multiplying network 16.

Fig. 9 shows an alternative in which the terminating impedances are high compared with the characteristic impedance of the line, the input terminating impedance being furnished by a series condenser 34' as in Fig. 7 and the output terminating impedance being furnished by a series resistor 32' as in Fig. 6. Inasmuch as the series condenser 34' itself introduces into the useful product output a factor which increases in proportion to frequency, no additional multiplying element is needed and the output may be supplied without further modification of its character to a reproducer 12.

The foregoing analysis applies in detail to the equalization of the characteristic of a simple rectangular gap or aperture, but the invention also contemplates the equalization of the characteristic of a non-rectangular aperture. The Mertz and Gray paper referred to above discusses the characteristics of apertures of various shapes. In the field of sound recording, such a non-rectangular aperture is illustrated by a reproducer head for deriving a signal from a record pattern on a magnetized tape in which the two faces of the head which define the gap are not parallel. Such a gap has a characteristic which is similar in its general character to that of curve A of Fig. 3 but departs therefrom in that the nulls are not equally spaced apart. Many such characteristics are shown in the Mertz-Gray paper above referred to. The transfer characteristic of a continuous transmission line, short-circuited or open-circuited at both ends, as in Figs. 1 and 2, but constructed to introduce a preassigned amount of dispersion is characterized by poles at frequencies which are unequally spaced apart. By coordination of the line parameters with the gap parameters, these poles may be located at the nulls of the aperture characteristic and the envelope of the line characteristic may be reciprocally related to that of the gap characteristic.

What is claimed is:

1. In combination with apparatus for generating a time signal from a space pattern which comprises an aperture of width $g$ past which said space pattern is moved with a relative speed $v$ and terminals at which the generated signal appears for application to a reproducer, said apparatus having a response having a significant factor which is a function of the wavelength of said space pattern, an equalizer for said response which comprises a uniform low-loss transmission line, and a reflecting termination at each end of said line, said line and said terminations, taken together, having a transfer admittance and being coupled in tandem between said terminals and said reproducer, the length and propagation speed of said line being so coordinated with the width $g$ of said aperture and with the speed $v$ of said relative movement that said transfer admittance is substantially the reciprocal of said significant factor.

2. Apparatus as defined in claim 1 wherein said function is characterized by null values for wavelengths which are integral multiples of the width of said aperture, and wherein the transfer admittance of said line is characterized by poles at frequencies derived from wavelengths for which said response function has nulls.

3. Apparatus as defined in claim 1 wherein the response function of said apparatus is proportional to $$\frac{\sin \frac{\pi g}{\lambda}}{\frac{\pi g}{\lambda}}$$

where $\lambda$ is the wavelength of said space pattern.

4. Apparatus as defined in claim 1 wherein the transfer admittance of said resonant line is proportional to $$\frac{1}{\sin \frac{\omega l}{v_0}}$$

where $l$ is the length of said line, $v_0$ is the propagation speed of waves on said line and $$\omega = \frac{2\pi v}{\lambda}$$

5. In combination with apparatus as defined in claim 1 wherein said response characteristic comprises an oscillating function having an envelope which varies inversely with frequency, an element connected in tandem with said line between said terminals and said reproducer, said element having a response which varies in direct proportion to frequency.

6. Apparatus as defined in claim 1 wherein said apparatus is coupled to said line by way of a step-down transformer and wherein said line is coupled to said reproducer by way of a step-up transformer, the impedances of said source and of said reproducer, respectively, as seen through said transformers from said line being several times lower than the characteristic impedance of said line.

7. Apparatus as defined in claim 1 wherein one termination of said line comprises a resistor shunted across said line having a magnitude which is several times smaller than the characteristic impedance of said line.

8. Apparatus as defined in claim 1 wherein one termination of said line comprises a resistor in series with said line having a magnitude which is several tmes larger than the characterstic impedance of said line.

9. Apparatus as defined in claim 1 wherein one termination of said line comprises a condenser connected in series with said line having a reactance at every frequency of interest which is several times larger than the characteristic impedance of said line.

10. Apparatus as defined in claim 9 wherein said series condenser constitutes a tandem-connected element having a response which increases substantially in direct proportion to frequency.

11. Apparatus as defined in claim 1 wherein each of said terminations comprise a condenser connected in series with said line, the reactance of each of said condensers at any frequency of interest being several times higher than the characteristic impedance of said line.

12. In combination with apparatus as defined in claim 11 wherein each of said condensers introduces a factor into the generated output signal which increases in substantially direct proportion with frequency, an element connected in tandem with said line and said condensers which introduces a compensating factor whose response is inversely proportional to frequency.

13. In combination with apparatus for generating a time signal from a space pattern which comprises an aperture of width $g$ past which said space pattern is moved with a relative speed $v$ and terminals at which the generated signal appears for application to a reproducer, said apparatus having a wavelength-response characteristic which is proportional to $$\frac{\sin \frac{\pi g}{\lambda}}{\frac{\pi g}{\lambda}}$$

where $\lambda$ is the pattern wavelength, an equalizer for said characteristic which comprises a uniform low-loss transmission line of length $l$, mismatching terminations at the ends of said line, and said terminations being coupled in tandem between said terminals and said reproducer, the length of said line being coordinated with the width of said aperture in accordance with the relation $$\frac{2l}{v_0} = \frac{g}{v}$$

where $v_0$ is the speed of propagation of signals on the line, and, in tandem with said combination, a differentiator.

14. In combination with apparatus for generating a time signal from a space pattern, which apparatus comprises an aperture of width $g$ past which said space pattern is moved with a speed $v$, and terminals at which the generated time signal appears for application to a reproducer, the response of said apparatus having a significant factor which is a function of the wavelength of said space pattern, an equalizer for said response comprising a uniform transmission line of length $l$ and propagation speed $v_0$ and a reflecting termination at each end of said line, said line being coupled in tandem between said terminals and said reproducer, the transfer admittance of said equalizer being given by a mathematical expression reciprocal in form to said significant factor and the argument of said mathematical expression being related to the argument of said significant factor in a ratio proportional directly to the length $l$ of said transmission line and inversely to the propagation speed $v_0$ thereof, the length $l$ and propagation speed $v_0$ of said line being so chosen that the argument of said significant factor equals the argument of said mathematical expression, whereby all variable terms of said mathematical expression are reciprocals of variable terms of said significant factor.

15. In combination with apparatus for generating a time signal from a space pattern, which apparatus comprises an aperture of width $g$ past which said space pattern is moved with a relative speed $v$ and terminals in which the generated signal appears for application to a reproducer, said apparatus having a wavelength-response characteristic which is proportional to $$\frac{\sin \frac{\pi g}{\lambda}}{\frac{\pi g}{\lambda}}$$

where $\lambda$ is the pattern wavelength, an equalizer for said characteristic which comprises a low-loss transmission line of length $l$ and propagation speed $v_0$, mismatching terminations at the ends of said line, said line being coupled in tandem between said terminals and said reproducer, the transfer admittance of said equalizer being proportional to the reciprocal sine of an argument in turn proportional to $$\frac{l}{v_0}$$

the length of said line being so chosen that $$\frac{2l}{v_0} = \frac{g}{v}$$

whereby the numerator of said wavelength response characteristic proportionality factor, sin $$\frac{\pi g}{\lambda}$$

becomes equal to the denominator of said transfer admittance, and, in tandem with said combination, a differentiator, said differentiator having a response characteristic proportional to frequency whereby the denominator of said wavelength-response characteristic proportionality factor varies, frequency-wise, directly with said differentiator response characteristic, whence all terms of said wavelength-response proportionality factor $$\frac{\sin \frac{\pi g}{\lambda}}{\frac{\pi g}{\lambda}}$$

have neutralizing reciprocal terms, in like fashion dependent upon frequency, appearing in the combination equalizer-differentiator response characteristic.

16. In signal reproducing apparatus transducing means for generating a time signal from a space pattern, said transducing means comprising an aperture of width $g$, means for moving said space pattern past said aperture with a relative speed $v$, thereby to generate a time signal related to said space pattern by a significant function of the wavelength of said space pattern, and terminals at which the generated signal appears, signal utilizing means, and in combination therewith, a low-loss transmission line interconnecting said terminals with said signal utilizing means, a reflective termination for each end of said line, whereby a transfer admittance is established between said terminals and said signal utilizing means, said line having a length and a propagation velocity so coordinated with the width $g$ of said aperture and the speed $v$ of said relative movement that said transfer admittance is inversely proportional to said significant function.

References Cited in the file of this patent

Magnetic Recording, Begun, 1949, page 176.